(12) United States Patent
Leen

(10) Patent No.: US 7,463,148 B2
(45) Date of Patent: Dec. 9, 2008

(54) WIRELESS MOTION ACTIVATED LIGHT FIXTURE BASE PLATE AND KIT

(76) Inventor: Monte A. Leen, 11730 NE. 12th St., Bellevue, WA (US) 98005-2458

( * ) Notice: Subject to any disclaimer, the term of this patent is extended or adjusted under 35 U.S.C. 154(b) by 0 days.

(21) Appl. No.: 11/041,757

(22) Filed: Jan. 21, 2005

(65) Prior Publication Data

US 2006/0170548 A1    Aug. 3, 2006

(51) Int. Cl.
*G08B 13/08* (2006.01)
(52) U.S. Cl. .................. 340/545.2; 340/565; 340/693.9
(58) Field of Classification Search .............. 340/545.2, 340/565, 539.14, 539.22, 539.23, 326, 330, 340/693.9, 693.11
See application file for complete search history.

(56) References Cited

U.S. PATENT DOCUMENTS

| | | | | |
|---|---|---|---|---|
| 4,737,770 A | * | 4/1988 | Brunius et al. | 340/539.22 |
| 5,626,417 A | * | 5/1997 | McCavit | 362/276 |
| 5,867,099 A | * | 2/1999 | Keeter | 340/567 |
| 6,087,938 A | * | 7/2000 | Gitelis et al. | 340/567 |
| 6,175,309 B1 | * | 1/2001 | Drake et al. | 340/545.3 |
| 6,472,997 B2 | * | 10/2002 | Leen | 340/815.45 |
| 6,741,176 B2 | * | 5/2004 | Ferraro | 340/568.1 |
| 6,819,239 B2 | * | 11/2004 | Bingham | 340/541 |
| 6,956,493 B1 | * | 10/2005 | Youngblood | 340/693.9 |

* cited by examiner

*Primary Examiner*—John A Tweel, Jr.
(74) *Attorney, Agent, or Firm*—Dean A. Craine

(57) ABSTRACT

A light fixture wireless motion detector conversion kit that includes an electrical box cover plate that houses a wireless receiver unit capable of receiving a signal from a wireless motion detector. Formed on the front surface of the plate is a center cavity upon which a standard light fixture bracket is attached. During assembly, the cover plate is securely attached to a vertical support surface while the base of a light fixture is attached to the bracket. The wireless receiver unit is electrically connected between an external 120 volt AC electrical circuit and the light fixture's wires. In the preferred embodiment, the wireless receiver unit includes an optional frequency switch, a mode switch, that allows the user to select different frequencies that matches the frequency used by the motion detector.

18 Claims, 5 Drawing Sheets

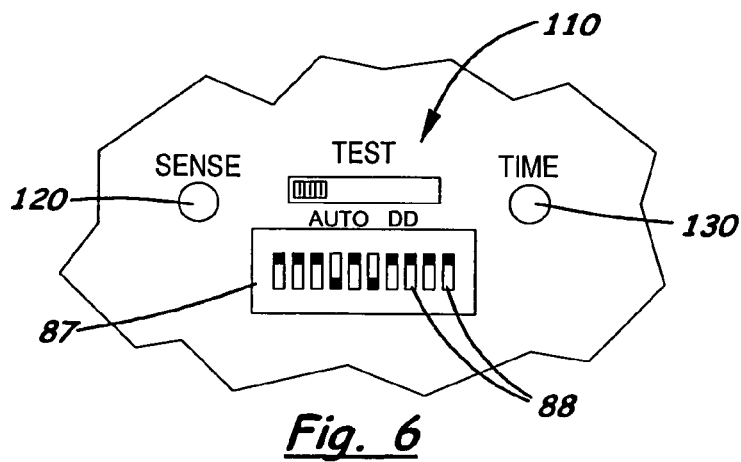
Fig. 6
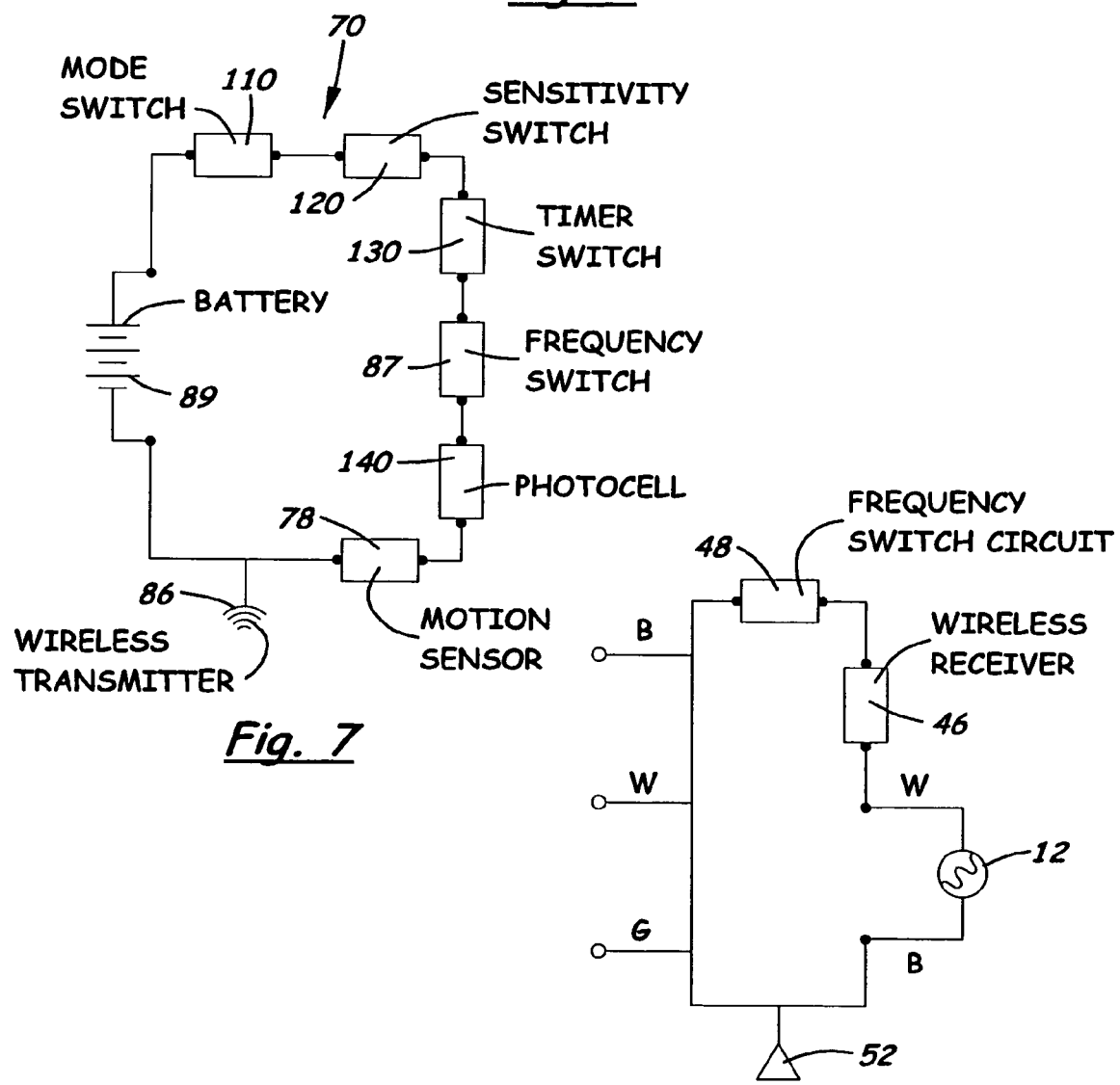
Fig. 7
Fig. 8

WIRELESS MOTION ACTIVATED LIGHT FIXTURE BASE PLATE AND KIT

BACKGROUND OF THE INVENTION

1. Field of the Invention

This invention relates to light fixtures, and more particularly to light fixtures connected to a motion detector.

2. Description of the Related Art

Light fixtures with a built-in motion detector are relatively common. Also common are motion detectors that are sold as separate units designed to be 'hardwired' to an existing light fixture.

Recently, home security kits have become available that include a wireless motion detector and a wireless receiver. The wireless receiver is assembled inside an electrical device that plugs into a standard electrical receptacle. Mounted on the side of the electrical device is an electrical receptacle that a lamp or radio plugs into. When an infrared emitting object passes through the area monitored by the motion detector a signal is transmitted to the wireless receiver inside the electrical device, which in turn, activates the lamp or the radio informing the homeowner that an infrared emitting object has entered the monitored area.

Today, there are hundreds of different styles of outdoor light fixtures. The large majority of these light fixtures do not include motion detectors. If a homeowner likes a particular style of light fixture and wants to connect it to a motion detector, he or she must purchase a separate motion detector unit and attach it directly to the base of the light fixture. The motion detector's wires are connected between an external 115 volt A.C. electrical power source and the light fixture. If a homeowner wants to position the motion detector away from the light fixture, he or she must mount an electrical box and cover plate onto a support surface overlooking the area to be monitored, extend an electrical conduit and wires from an external 115 A.C. electrical power source to the electrical box, and then mount the motion detector on the cover plate. Due to the high cost of parts and labor, many homeowners elect not to add motion detectors to their existing light fixtures.

What is needed is a base plate with a built-in wireless transmitter and kit that includes the base plate and a wireless motion detector that allows any standard light fixture to be easily and inexpensively converted to a wireless motion activated light fixture.

SUMMARY OF THE INVENTION

It is an object of the present invention to provide a base plate with a wireless transmitter that can be used with a standard light fixture and a wireless motion detector that enables the light fixture to be converted into a motion activated light fixture.

It is another object of the present invention to provide a complete kit that includes the above described base plate and a compatible wireless motion detector.

These and other objects of the present invention are met by an electrical box cover plate with a built-in wireless receiver capable of receiving signals from a compatible wireless motion detector unit. Mounted on the front surface of the cover plate is a light fixture bracket designed to attach to a standard light fixture base. During assembly, the cover plate is securely attached to a vertical support surface while the base of a standard light fixture is securely attached to the fixture bracket. The wireless receiver is located inside a protective inner cavity formed inside the cover plate. The wireless receiver is electrically connected between an external 120 volt AC electrical circuit and the light fixture. The wireless receiver activates the light fixture when a signal is received from a wireless motion detector located in a nearby motion detector unit.

For convenience, the above cover plate is included in a kit that includes a wireless motion detector unit compatible with a motion sensor coupled to an internal wireless transmitter. The motion detector unit may be battery operated or connected to an external 115 volt A.C. electrical power source. In the preferred embodiment, the wireless motion detector unit includes a motion sensor connected to a mode switch that allows the motion sensor to be operated in a standard operational mode or a testing mode, a sensitivity switch that controls the motion sensor's sensitivity, a timer switch that controls the length of time the motion sensor remains activated after detecting an object, a frequency selection switch that adjusts the sensor to communicate only with a nearby wireless receiver having the same frequency switch settings as the wireless motion detector, and an optional photocell that allows activation of the motion sensor 24 hours per day or only during night time hours.

DESCRIPTION OF THE DRAWINGS

FIG. 6 is a bottom plan view of the wireless motion detector showing the sensitivity switch, the frequency switches, and the timer switch.

FIGS. 7 and 8 are electrical diagrams of the motion detector unit and the receiver unit.

DESCRIPTION OF THE PREFERRED EMBODIMENT(S)

Figure 1:
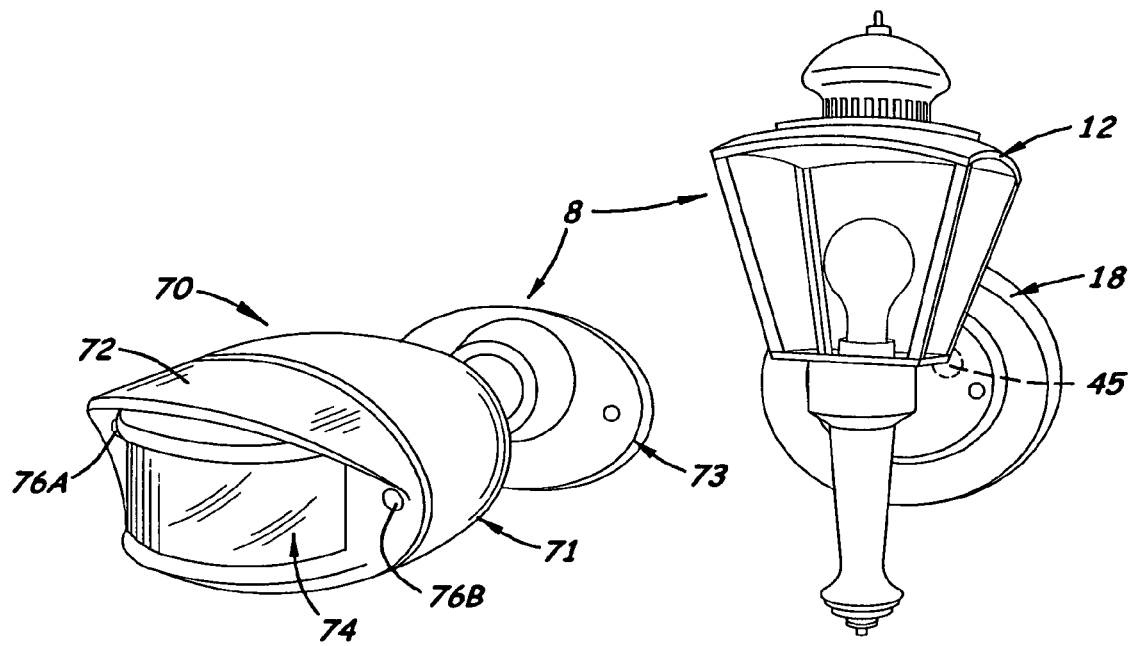
FIG. 1 is a perspective view of a standard outdoor light fixture with a round base attached to the cover plate disclosed herein and a wireless motion detector unit included in the kit.

Shown in the accompanying Figs. there is shown a kit, generally referenced as 8, designed to convert a standard light fixture 12 into a motion activated light fixture 12. The electrical box cover plate 18 may be sold and distributed separately or combined in a kit 8 with a wireless motion detector 70 capable of transmitting signals to the wireless receiver 46 located in the cover plate 18.

In the preferred embodiment, the cover plate 18 is a cylindrical structure with a flat front surface 20 and curved outer sidewalls 22. Formed centrally on the front surface 20 is a cylindrical recessed front cavity 25. The depth of the front cavity 25 and the width of the sidewalls 22 are substantially identical so that the cover plate 18 may be mounted flush on a flat, vertical support surface 90.

Figure 3:
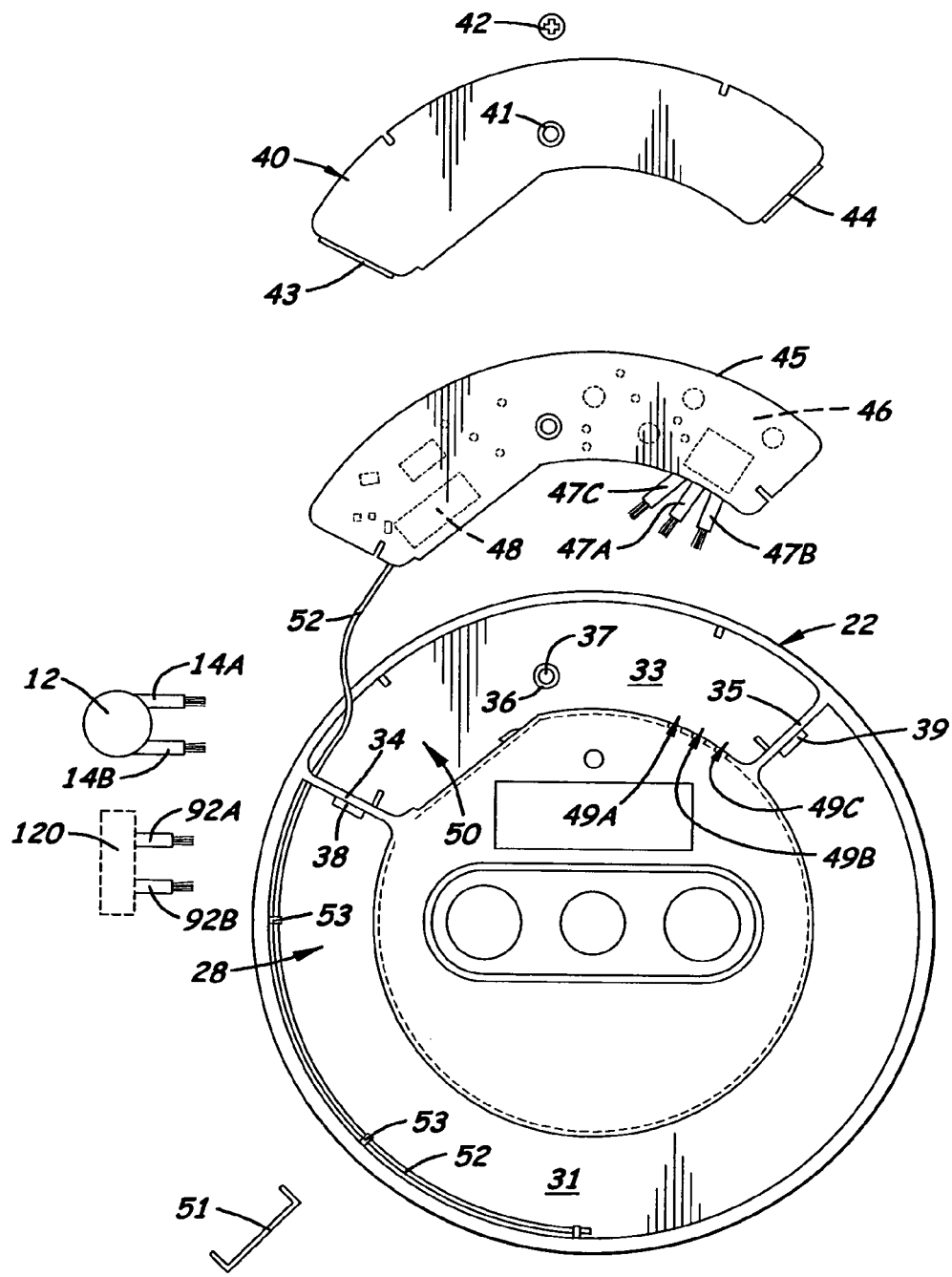
FIG. 3 is a top plan view of the cover plate showing the protective cover for the wireless receiver cavity the PCB removed.

As shown in FIG. 3, formed on the back of the cover plate 18 is a ring cavity 28. The ring cavity 28 is divided into two first and second rear cavities 31, 33 by two radially aligned walls 34, 35. Formed centrally on the second rear cavity 33 is a rearward extending post 36 with a longitudinally aligned bore 37 formed therein. Formed on the outer surfaces of the two walls 34, 35 are two lips 38A, 38B, respectively. During assembly, a removable lid 40 complimentary in shape with the second rear cavity 33 is aligned and registered there over. A bore 41 is formed on the lid 40 that is aligned and registered with the bore 37 on post 36 when the lid 40 is aligned and registered over the second rear cavity 33. A threaded connector 42 is inserted though the bores 37, 41, and used to connect the lid 40 to the post 36. The lid 40 includes two perpendicular aligned biased clips 43, 44 that extend inward on the first rear cavity 31 and selectively engage the two lips 38, 39, respectively, to tightly hold the lateral edges of the lid 40 against the walls 34, 35 to create a water tight seal.

Disposed inside the second rear cavity 33 is a printed circuit board (hereinafter referred to as a PCB 45). Located on the PCB 45 is a built-in wireless receiver 46 capable of communicating with a wireless transmitter in a nearby wireless motion detector. Attached to the PCB 45 is an optional frequency switch 48 with a plurality of dip switches 49 that enables the user to select a different radio frequency on the wireless receiver 46 that matches the radio frequency of the wireless transmitter on the wireless motion detector. Attached to the wireless receiver 46 is a flexible antenna 52 that extends through a hole formed on the wall 34 and into the first cavity 31. In the preferred embodiment, two small clips 53 are formed along the inside surface of the first cavity 31 that securely holds the antenna 52 in the first cavity 31.

Figure 2:
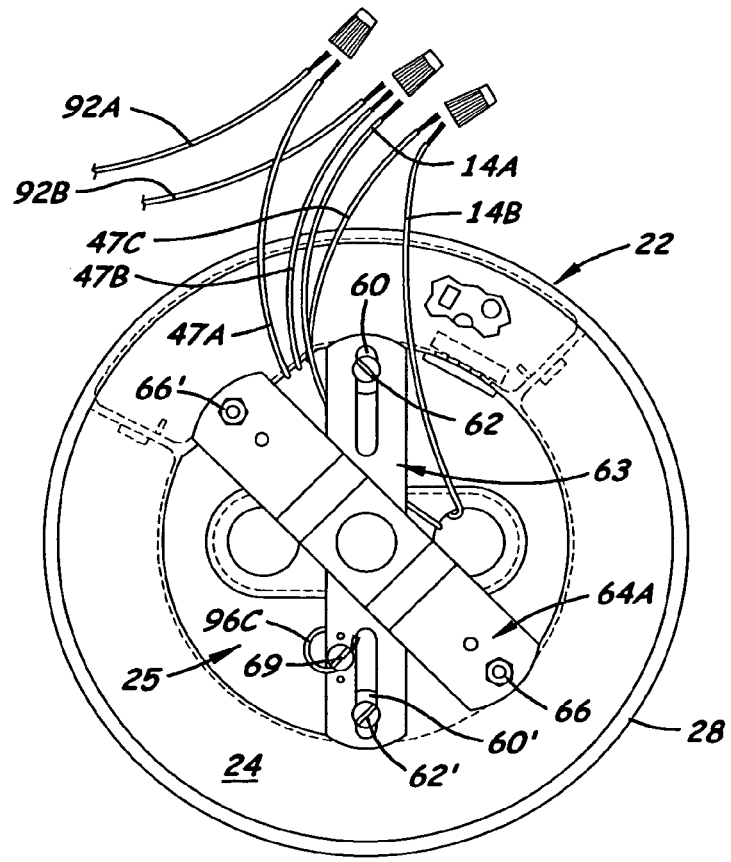
FIG. 2 is a top plan view of an assembled cover plate with a standard light fixture bracket attached thereto.
Figure 4:
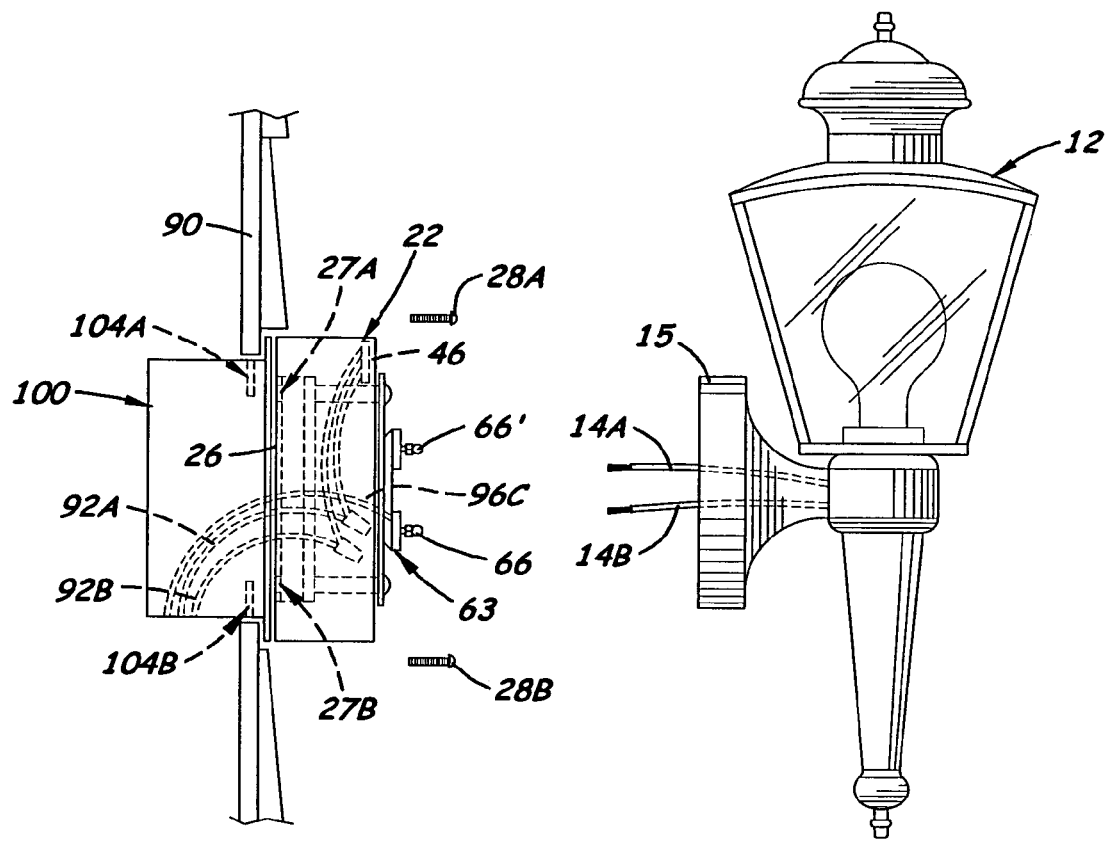
FIG. 4. is a sectional side elevational view of the cover plate taken along line 4-4 in FIG. 3.

The PCB 45 includes three input wires (black 47A, white 47B and red 47C) that connect to the hot and neutral wires 92A, 92B, respectively, from an external 120 volt AC electrical power source as shown in FIGS. 2 and 4. The three input wires 47A, 47B and 47C also connect to the hot and neutral wires 14A, 14B, respectively, from the light fixture 12. In the preferred embodiment, the three wires 47A, 47B, 47C from the PCB 45 extend through holes 49A, 49B, 49C, respectively, formed on the inner wall 25A adjacent to the front recessed cavity 25.

Formed on the opposite inside wall 33A of the second cavity 33 and adjacent to the frequency switch 48 on the PCB 45 is a frequency switch opening 50. The frequency switch opening 50 provides access to the frequency switch's adjustable dip switches 49. During setup, the position of the dip switches 49 are adjusted to the same settings on the dip switches on the wireless transmitter thereby enabling the two units to communicate. An optional cover 51 made of rubber is placed around the frequency switch opening 50 to keep moisture and water out of the second rear cavity 33.

As shown in FIG. 2, formed on the opposite sides of the front recess cavity 25 are two posts 60, 60'. Formed longitudinally on each post projection 60, 60' is a threaded bore, not shown. During assembly, a light fixture bracket 63 is transversely aligned over the front cavity 25 and attached to the two posts 60, 60' via two threaded connectors 62, 62' respectively. The light fixture bracket 63 includes a rotating wing-shaped outer strap 64A that is centrally attached to the light fixture bracket 63. Formed on the opposite ends of the outer strap 64A are two threaded bores (not shown) that connect to two threaded bolts 66, 66,' respectively. During use, the threaded bolts 66, 66' extend through two non-threaded holes (not shown) formed on the light fixtures' base 15 and connect to two bores (now shown) on the outer bracket 64A, respectively, to securely hold the base 15 on the cover plate 18.

As shown in FIG. 4, during assembly, the cover plate 18 is first securely attached to a round 4"inch diameter electrical box 100 mounted on a flat support surface 90. Bores 27A, 27B formed on the back wall 26 of the front cavity 25 received threaded screws 28A, 28B, respectively that connected to threaded bores 104A, 104B on the electrical box 100, respectively. As shown in FIG. 2, the wires 47A, 47B, 47C from the wireless receiver 46 are connected to the two wires 92A, 92B from the external 120 volt AC electrical circuit and to the two light fixtures' wires 14A, 14B (see FIG. 4). The ground wire 92C from the external 12 volt AC electrical circuit is attached to the ground twist-on wire connector 69 attached to the fixture bracket 63. As shown in FIG. 4, the base 15 of the light fixture 12 is then attached to the inner fixture bracket 63.

Figure 5:
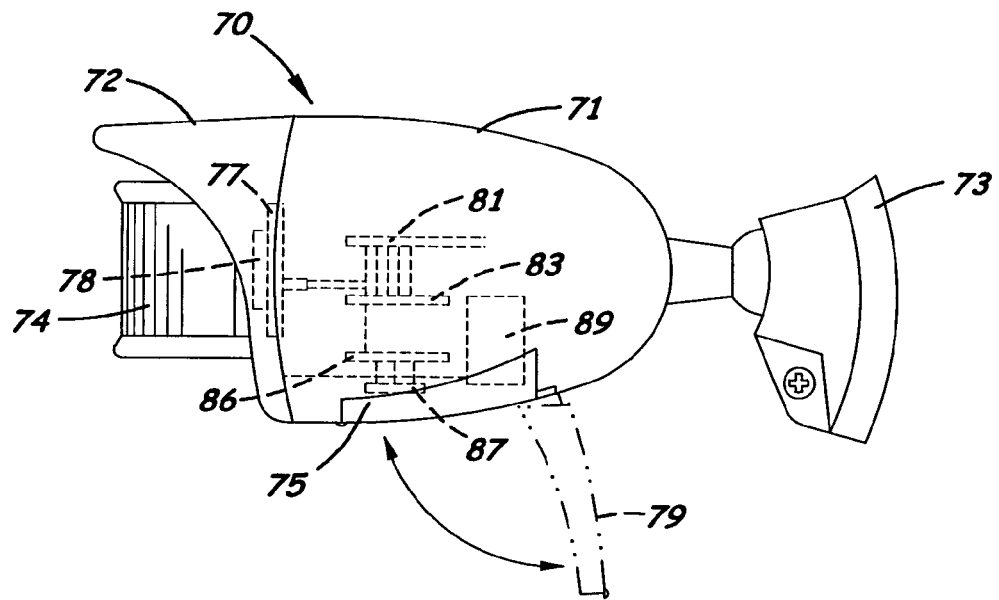
FIG. 5 is a side elevational view of the wireless motion detector.

As mentioned above, the cover plate 18 may be sold with a compatible wireless motion detector 70 thereby forming a kit 8 shown in FIG. 1. In the preferred embodiment, the wireless motion detector 70 includes an outer housing 71 pivotally mounted on a base 73. Located on the front surface of the outer housing 71 is a removable front cap 72. The cap 72 includes a front lens 74 and at least two LED 76A, 76B mounted on opposites of the front surface (shown in FIG. 1). As shown in FIG. 5, located inside the outer housing 71 and behind the lens 74 is a transversely aligned PIR printed circuit board 77 upon which the components used for the motion sensor 78 are mounted.

Located in the center cavity of the outer housing 71 is a primary printed circuit board 81 and a secondary printed circuit board 83. The primary printed circuit board 81 is stacked above the secondary printed circuit board 83. The primary printed circuit board 81 contains the electrical components used to control the mode circuit and the sensitivity switch. The secondary printed circuit board 83 includes the frequency switches for the motion sensor 78.

Located inside the outer housing 71 is a battery 89 used as an electrical power source for the motion sensor 78. Mounted on the secondary PCB 83 is a wireless transmitter 86 capable of communicating with the wireless receiver 46 located in the cover plate 18. Also, mounted on the transmitter 86 is a frequency switch 87. As shown in FIG. 6, the frequency switch 87 includes a plurality of dip switches 88. Connected to the transmitter 86 is a mode switch 110, a sensitivity switch 120, and a timer switch 130 that extend into a recessed control cavity 77 located on the bottom surface of the outer housing 71. In the preferred embodiment, an optional photocell 140 may be mounted on the primary circuit board 81.

During assembly, the base 73 of the wireless motion detector unit 70 is attached to a vertical support surface near or adjacent to the desired monitored area. The distance between the motion detector unit 70 and the cover plate 18 must be within a sufficient range so that a signal from the wireless transmitter 86 may be received by the wireless receiver 46 in the cover plate 18. A battery 89 is inserted into the motion detector unit 70. The dip switches 49 on the frequency switch 48 are then adjusted to match the dip switches 88 on the motion detector's frequency switch 87.

During the setup procedure, the lower door 79 on the outer housing is opened and the mode switch 110 is then selected to a 'test' mode position. The outer housing 71 is then properly aimed over the monitored area and the sensitivity switch 120 and timer switch 130 are adjusted to operate optimally. The optional green and red LED lights 76A, 76B are mounted on the front cap 72 of the outer housing 71 and are used to assist the user in setting up the detector 70. After the setup procedure has been completed, the mode switch 110 is moved to the "Auto" or Dusk-to-Dawn" mode positions.

As stated above, the kit 8 enables a user to convert any standard light fixture 12 that is attached to a building via a standard base plate 22 and electrical box 100 into a motion detecting light fixture 12. The size and shape of the cover plate 18 are a standard shape and size to be used with any standard light fixture. They are made of metal and can be supplied in a standard color (white or black) that can be easily painted to match the color of the light fixture.

Figure 9:
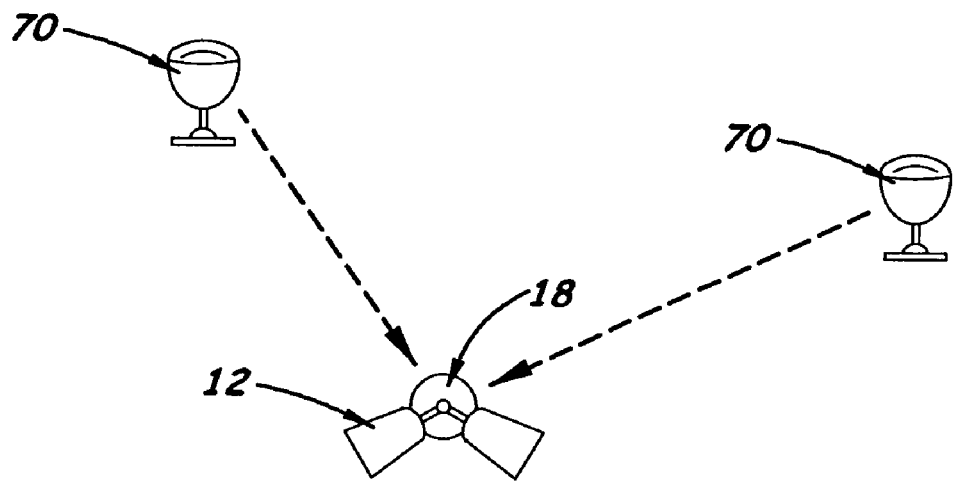
FIG. 9 is an illustration showing a single motion detector unit linked to two light fixtures located at different doorway entrances to a building.
Figure 10:
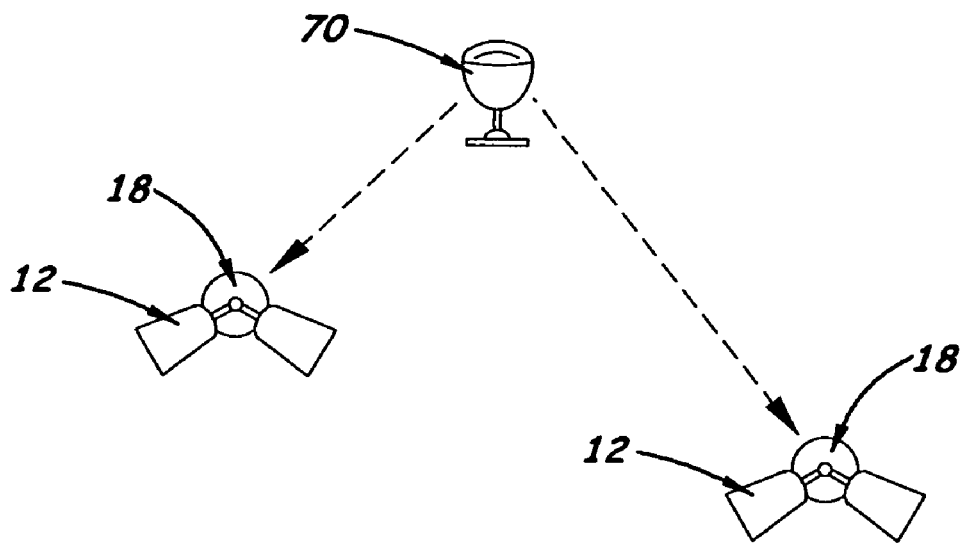
FIG. 10 is an illustration showing two motion detector units linked to one light fixture located near one doorway entrance to a building.

As shown in FIGS. 9 and 10, a different combination of light fixtures and motion sensors may be coupled together to monitor and illuminate different areas around a building. For example, FIG. 9 shows a single motion detector unit located near the front sidewalk of a home that is used to illuminate two or more light fixtures 12, 12' located at different doorway entrances. Alternatively, FIG. 10 shows two motion detector units 70, 70' located near different sidewalks that are used to illuminate a single light fixture 70 located near one entrance to the home. Because the frequency switches on the cover plates and on the detector units can be selectively matched and mis-matched, various combinations of light fixtures and detector units can be linked together for different uses.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A wireless motion activated light fixture kit, comprising:
   a.) a light fixture that includes a base, a light connector, at least one light bulb, and a set of wires capable of connecting to an electrical source;
   b.) a cover plate that includes a central front cavity and an inner cavity,
   c.) means for selectively attaching said cover plate to a rigid surface;
   d.) a wireless receiver mounted inside said inner cavity and electrically connected to an external electrical source and to said light fixture;
   e.) a light fixture bracket attached to said front cavity in said cover plate enabling said base of said light fixture to be selectively attached to said cover plate; and,
   f.) a wireless motion detector unit including a motion sensor coupled to a wireless transmitter that produces a signal capable of being detected by said wireless receiver when said motion sensor detects movement thereby activating said light bulb in said light fixture.

2. The wireless motion activated light fixture kit, as recited in claim 1, further including a mode switch located on said motion detector unit enabling said motion detector unit to operate in a test mode and an operational mode.

3. The wireless motion activated light fixture kit, as recited in claim 1, further including a sensitivity switch connected to said motion detector unit.

4. The wireless motion activated light fixture kit, as recited in claim 1, further including a frequency-selection switch connected to said wireless receiver.

5. The wireless motion activated light fixture kit, as recited in claim 2, further including a frequency selection switch coupled to said wireless receiver.

6. The wireless motion activated light fixture kit, as recited in claim 3, further including a frequency selection switch coupled to said wireless receiver.

7. The wireless motion activated light fixture kit, as recited in claim 1, further including a photocell connected to said motion sensor.

8. The wireless motion activated light fixture kit, as recited in claim 2, further including a photocell connected to said motion sensor.

9. The wireless motion light fixture kit, as recited in claim 3, further including a photocell connected to said motion sensor.

10. The wireless motion activated light fixture kit, as recited in claim 4, further including a photocell connected to said motion sensor.

11. A device for converting a standard light fixture into wireless motion controlled light fixture comprising:
    a.) cylindrical cover plate with a front surface, curved outer side walls, a front recessed cavity, and an inner cavity;
    b) means for attaching said cover plate to a support surface;
    c) a light fixture bracket attached to said front cavity of said cover plate used to connect a light fixture to said front surface of said cover plate; and,
    d) a wireless receiver located inside said inner cavity and connected to an external electrical source and to a light fixture when connected to said light fixture bracket, said wireless receiver capable of communicating with a nearby wireless transmitter.

12. The device, as recited in claim 11, further including a frequency switch connected to said wireless receiver enabling the radio frequency that said wireless receiver uses to be adjusted.

13. The device, as recited in claim 11, further including a front cavity over which said light fixture bracket is attached.

14. The device, as recited in claim 11, wherein said cover plate is sold as a kit with a wireless motion detector with said wireless receiver mounted therein capable of communicating with said wireless receiver.

15. The device, as recited in claim 14, wherein said wireless transmitter is battery operated.

16. The device, as recited in claim 14, wherein said wireless transmitter includes a frequency switch.

17. The device, as recited in claim 14, wherein said wireless transmitter is connected to a photocell.

18. The device, as recited in claim 14, wherein said wireless transmitter includes a mode switch enabling said wireless transmitter to operate in a test mode or standard operation mode.

\* \* \* \* \*